United States Patent Office 2,894,295
Patented July 14, 1959

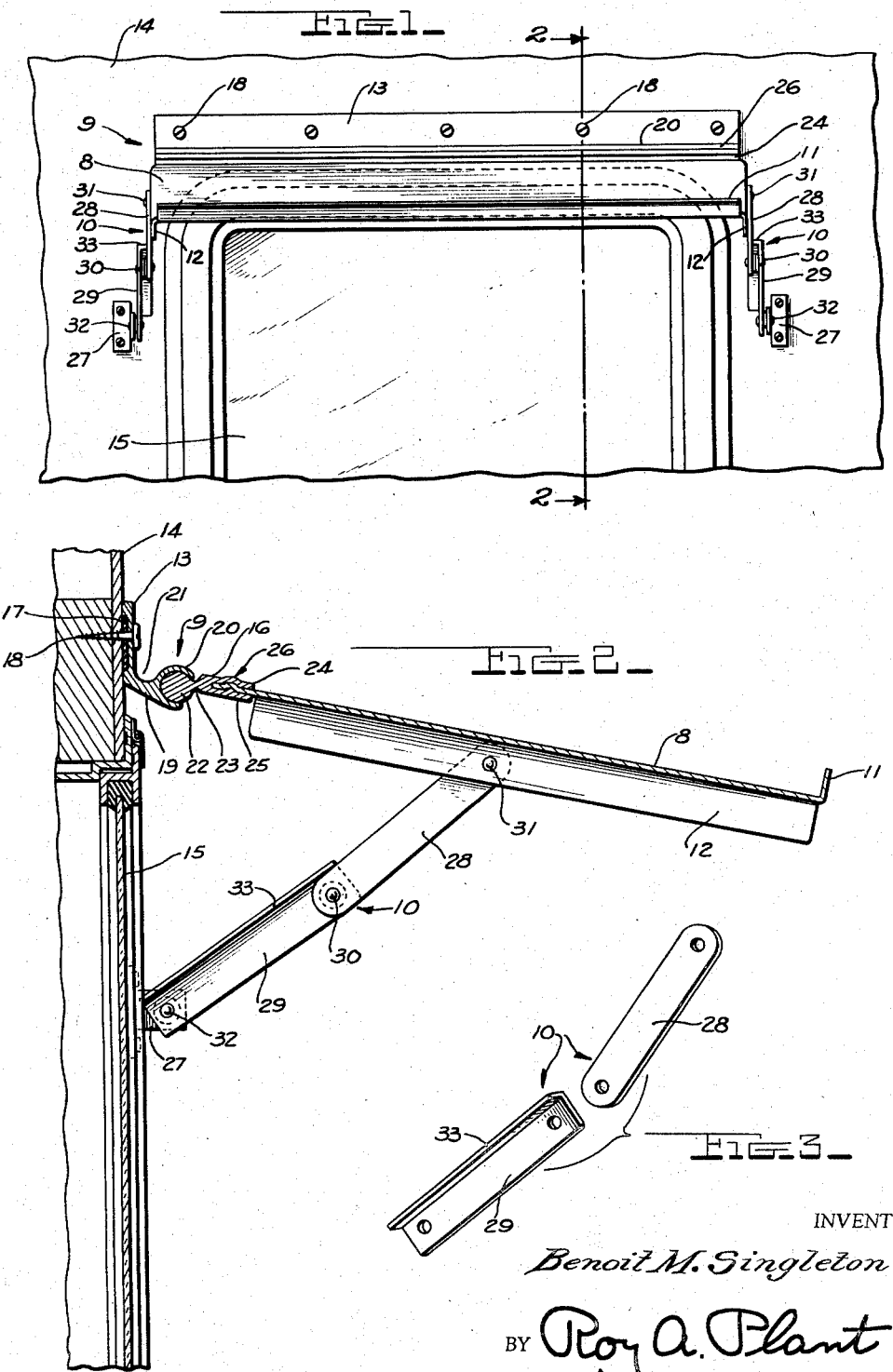

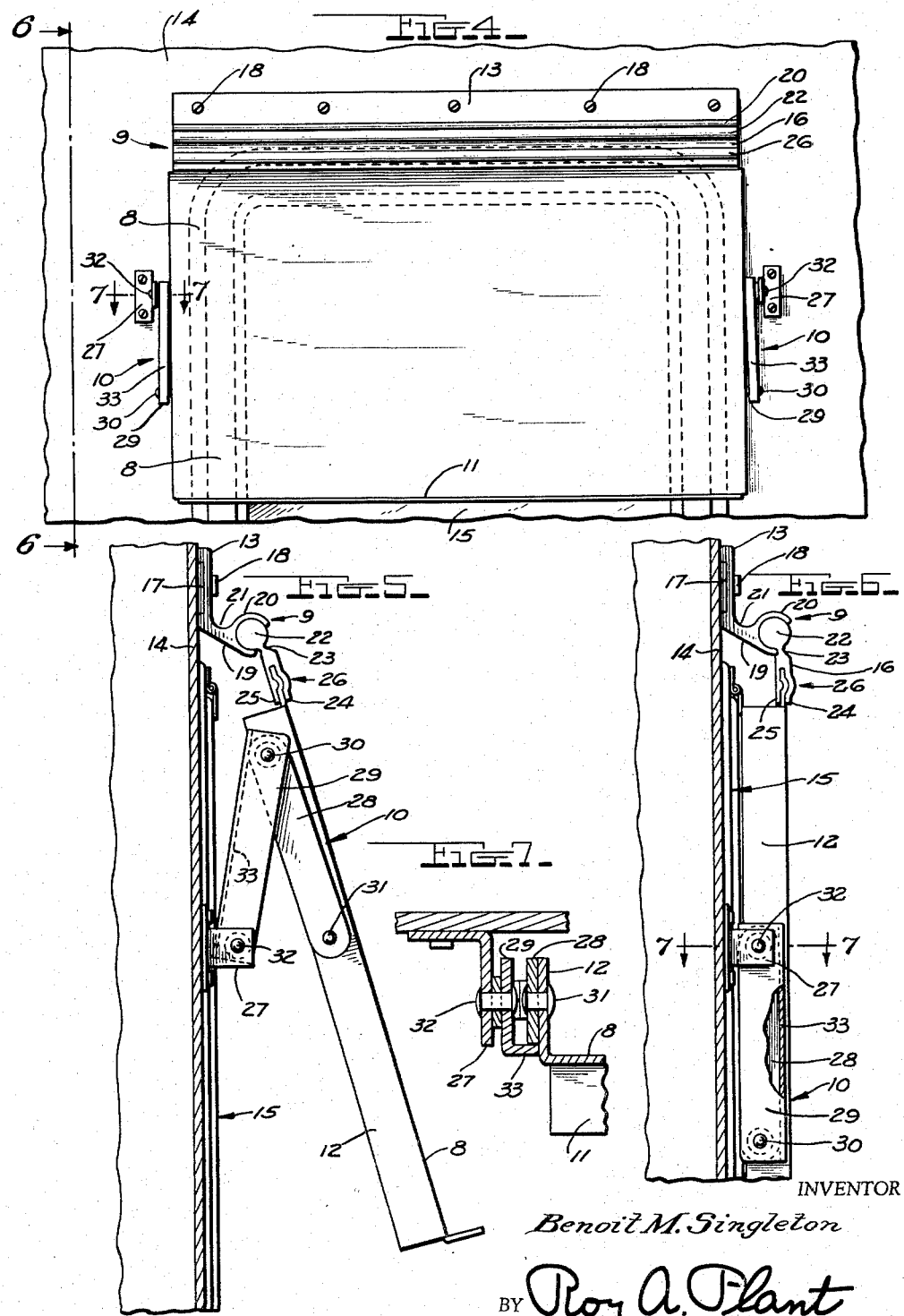

2,894,295

AWNING ASSEMBLY

Benoit M. Singleton, Marshall, Mich., assignor to Woodlin Metal Products, Marshall, Mich., a corporation of Michigan Application July 6, 1954, Serial No. 441,468

3 Claims. (Cl. 20—57.5)

The present invention relates broadly to sheltering apparatus, and in its specific phases to a folding assembly particularly adapted for use as an eave member over a house trailer window or the like.

The windows and doors of house trailers are commonly exposed and unprotected by eaves or awnings, with the result that rain runs down over the face of the windows taking with it any dust or dirt which has accumulated on the roof and thus soils and streaks the window panes. Moreover, some rain water often leaks in around the upper portion of the windows and doors, particularly during hard driving rain storms. It was a recognition of these difficulties and shortcomings of house trailer window and door constructions which led to the conception and development of the present invention.

Accordingly among the objects of the present invention is the provision of a novel eave or awning which will effectively protect a house trailer window or door, or multiples of same, and will also act as a sun shade.

In carrying out the above end, another object is to provide a metal eave or awning which is hinged to the trailer above the window or door, and is compactly foldable downwardly for traveling, so as to present substantially no hazard of its striking passing vehicles or other objects.

An object is to provide a novel extruded metal hinge for the eave or awning, a portion of which hinge acts as a gutter over the window.

Another object is to connect the eave or awning member with the hinge in a simple and effective way without the use of bolts, screws or rivets.

Yet another object is to provide a novel dual-function linkage for holding the eave or awning member extended for normal use, and for locking it in downwardly folded position for traveling.

A further object is to provide a simple and inexpensive eave or awning construction which may be expeditiously manufactured, easily installed, and profitably marketed at a reasonable price.

Still further objects and advantages of the present invention will appear as the description proceeds.

To the accomplishment of the foregoing and related ends, the invention, then, consists of the sheltering apparatus hereinafter fully described and particularly pointed out in the claims, the annexed drawings and the following description setting forth in detail certain means for carrying out the invention, such disclosed means illustrating, however, but one of the various ways in which the principle of the invention may be used.

In the accompanying drawings:

Figure 1 is a front elevation showing one of the eaves or awnings of the present invention attached to a portion of a house trailer at an enlarged window thereof.

Figure 2 is a vertical sectional view taken on line 2—2 of Figure 1, looking in the direction of the arrows.

Figure 3 is an exploded perspective view showing two of the supporting and locking links of the dual function operating linkage.

Figure 4 is a front elevation showing the eave or awning locked in downwardly folded position.

Figure 5 is an enlarged end elevation showing the eave or awning in almost completely folded position.

Figure 6 is an enlarged vertical sectional view on the line 6—6 of Figure 4, looking in the direction of the arrows, and showing the eave or awning locked in downwardly folded position.

Figure 7 is a further enlarged detail horizontal sectional view taken on the line 7—7 of Figures 4 and 6, looking in the direction of the arrows.

The drawings illustrate one practicable form of construction of the eave or awning, and while that construction will be specifically described, it is to be understood that variations may be made within the scope of the invention as claimed. Moreover, it is to be understood that the invention is not restricted to use over windows on house trailers and that it may be used over various portions needing limited protection, such as over doors when sufficient clearance can be obtained for outward swinging of the door, or when the door opens inwardly.

The eave or awning member is generally denoted at 8, the hinge means for mounting it at 9, and the dual-function linkage at 10, said linkage serving to hold the member 8 extended as in Figures 1 and 2 or in downwardly folded position as in Figures 4 and 6.

The member 8 which will be hereinafter referred to only as an eave member, is in the form of a suitably proportioned substantially rectangular sheet metal plate having an upturned flange 11 on its lower edge and downturned flanges 12 on its ends, said plate being preferably of an aluminum alloy. The flange 11 acts as a reinforcement and also as a gutter to prevent a sheet of rain water from running directly off the outer edge of the eave member and interfering with vision through the window during light rain storms. The flanges 12 act as reinforcements and aid in connecting the linkage 10 to the eave member 8.

The hinge means 9 comprises a fixed leaf member 13 to be secured against a trailer wall or the like 14 over a window 15, a movable leaf member 16 secured to the upper end of the eave member 8, and a pivotal connection, described below, between said leaf members 13 and 16.

The fixed leaf member 13 is preferably channeled to receive a sealing gasket 17 and is apertured to receive attaching fasteners 18. The lower edge of this leaf member 13 is provided with an integral longitudinal outwardly projecting flange 19 which preferably declines outwardly to some extent. The outer edge of the flange 19 is of longitudinally bifurcated form and transversely curved to provide a longitudinally split tubular knuckle 20. This knuckle projects upwardly from the contiguous portion of the flange 19 to provide a gutter 21.

The movable leaf member 16 has a cylindrical longitudinal rod-like knuckle 22 integrally joined to its upper edge by a longitudinal neck 23, said knuckle 22 being turnably received in the split tubular knuckle 20. The lower longitudinal edge portion of the leaf member 16 is bifurcated to provide flanges 24, 25 between which the upper edge portion of the eave member 8 is tightly clamped, said edge portion and flanges having an interlocking bead-and-groove formation 26 which obviates the necessity of using rivets, bolts or screws in connecting the elements 8 and 16.

The entire hinge means 9 may be easily constructed from two extruded metal members of aluminum alloy, said members being assemblable by endwise sliding into pivotal engagement with each other.

There are two sets of the linkage 10, one at each end of the eave member 8 (a right and a left) and connecting the flanges 12 of the eave with brackets 27 for attachment to the wall 14. The two linkage sets, while used in rights and lefts for each eave assembly, are substantially duplicates and a description of one will suffice for a clear understanding of the construction involved.

An upper inclined flat link 28 and a lower inclined link 29 of the linkage 10 overlap at one end and are connected to each other by a pivot 30. The upper end of the link 28 is connected with the flange 12 by a pivot 31, and the lower end of the link 29 is connected to the bracket 27 by a pivot 32. The distance from said pivot 30 to the pivot 31 and the distance from said pivot 30 to the pivot 32 are substantially identical. Also, the distance from pivot 31 to the pivotal axis of the hinge means 9 and the distance from pivot 32 to said pivotal axis, are substantially identical.

The upper edge of the lower link 29 of the linkage 10 preferably has a lateral longitudinal stop flange 33 a portion of which lies on the upper edge of the link 28 when the central pivot 30 is slightly below dead-center, as shown in Figure 2, thus holding the links stabilized in the positions which they normally occupy to hold the eave member 8 extended. The stop flange 33 also performs another important function explained below.

When the eave member 8 is to be downwardly folded to the position of Figures 4 and 6, the links 28 and 29 are upwardly buckled to permit such folding, as will be clear from Figure 5. Due to the spacing of the pivots 30, 31, and 32, the pivots 31 and 32 will be in alinement with each other when the eave member 8 reaches its completely folded position. The two links 28, 29 thus overlap and are then bodily swung outwardly and downwardly about the alined pivots 31, 32 to the inverted position shown in Figures 4 and 6. This disposes the stop flange 33 of the bracket-carried link 29 at the outer edge of the eave-carried link 28 as seen fully in Figures 6 and 7. Consequently, the eave member 8 is tightly held in downwardly folded position and cannot be pulled outwardly away from the wall 14 until the links 28 and 29 are again swung upwardly to their uppermost position about the alined pivots 31, 32. Thus the eave member 8 is securely locked in lowered position as long as the links are in the position of Figures 4 and 6 and there is no danger of said eave member swinging out and striking a passing car or other object while traveling.

From the foregoing it will be seen that a novel and advantageous folding eave construction has been disclosed for attaining the desired ends which are particularly desirable in connection with house trailers. However, attention is again invited to the possibility of making variations and to the fact that the invention is not restricted to use with house trailers nor confined to use with windows. While, for convenience, the eave assembly has been shown in its normal horizontally hinged position over a window, it is not limited to that position since it can be used in other places and positions if desired. The directional terms such as "upper," "lower," "downwardly," "outwardly," "over," and "horizontally," are accordingly to be considered as relative only, and not limiting on the eave construction involved.

Other modes of applying the principle of my invention may be employed instead of the one explained, change being made as regards the assembly and combinations herein disclosed, provided the means stated by any of the following claims or the equivalent of such stated means be employed.

I therefore particularly point out and distinctly claim as my invention:

1. In an assembly including a movable member and a hinge mounting said member on a support for swinging movement from a normally extended position to a folded position; two links pivotally connected at adjacent inner ends and equidistantly therefrom pivoted at their outer ends to said movable member and said support respectively to normally hold the former in said extended position, the distances of the link pivots with respect to the axis of rotation defined by said hinge being such that the pivots at the outer ends of said links are alignable coaxially when said movable member is swung to said folded position, both links being simultaneously swingable to a reversed position about the pivots at said outer ends, and stop means on one of said links abuttingly engageable with the other of said links, holding said movable member against outward swinging when said links occupy said reversed position.

2. A structure as specified in claim 1; said stop means comprising a lateral flange on one edge of one of said links to abut one edge of the other link.

3. A structure as specified in claim 1; said stop means comprising a lateral flange on one edge of one of said links to abut one edge of the other link, said flange having a portion active to hold said links in a slightly-past-dead-center position when said movable member is in extended position.

References Cited in the file of this patent

UNITED STATES PATENTS

| 1,154,920 | Greenfield | Sept. 28, 1915 |
| 1,278,456 | Greenfield | Sept. 10, 1918 |
| 1,956,850 | Bishop et al. | May 1, 1934 |
| 1,964,842 | Bauer | July 3, 1934 |
| 2,498,535 | Falk | Feb. 21, 1950 |
| 2,611,936 | Wheeler | Sept. 30, 1952 |
| 2,629,145 | Parsson | Feb. 24, 1953 |
| 2,691,803 | Keebler | Oct. 19, 1954 |

FOREIGN PATENTS

| 25,290 | Switzerland | Sept. 25, 1905 |